Oct. 13, 1964     G. W. FAUROT     3,152,576
ANTI-SPLASH WATERING AND FEEDING DEVICE FOR PET ANIMALS
Filed July 22, 1963

INVENTOR
George Wesley Faurot
ATTORNEY

United States Patent Office 3,152,576
Patented Oct. 13, 1964

3,152,576
ANTI-SPLASH WATERING AND FEEDING DEVICE FOR PET ANIMALS
George Wesley Faurot, Falls Church, Va.
(729 Parma Way, Los Altos, Calif.)
Filed July 22, 1963, Ser. No. 296,779
7 Claims. (Cl. 119—72)

The present invention relates to animal husbandry, and more particularly to a watering and feeding device for pet animals and the like.

One object is to provide an anti-splash watering device for domestic pets and the like which is adapted to be used in motor vehicles while transporting the animals during motor trips in conventional motor cars of the passenger type.

Another object is to provide a combined watering and feeding device in which the watering device can be quickly converted for containing solid foods by the insertion of a removable and disposable container in the opening of the watering device. The arrangement being such that the same structure can be used alternately for containing a supply of water or food to various domestic pet animals.

Another object is to provide an anti-splash watering device of the above-mentioned type having an access opening surrounded by an inverted frusto-conical wall which extends from the top of the container downwardly therein a distance substantially equal to two-thirds of the container height with the lower edge arranged in a plane in alignment with the plane passing through the peripheral edge of a dished bottom wall. The construction being such that sudden jarring or movement imparted to the container will prevent the liquid or water therein from being splashed, and in the event that the container is overturned the water will remain in the container and will fill a portion of an annular chamber instead of being displaced through the access opening and running over the floor of the passenger vehicle or other support upon which the watering device is used.

Another object is to provide an anti-splash watering device for domestic pet animals having a dished or curved bottom wall which is generated from a point above the container spaced a distance therefrom equal to three times the height of the container.

Another object is to provide an anti-splash watering device for domestic pet animals having a removable cover to facilitate removal of the water and cleaning the inner walls of the container to remove foreign particles and material therefrom. The container cannot be emptied unless the cover is removed due to the fact that the contents will not be completely discharged even though the container is moved to various positions in an attempt to displace the liquid contents.

Another object is to provide an anti-splash watering device of the above-mentioned type which comprises few parts, can be economically and easily manufactured as well as being light in weight and convenient to store when not in use.

Other objects and advantages of the invention will become apparent during the course of the following description of the accompanying drawing wherein.

Figure 1:
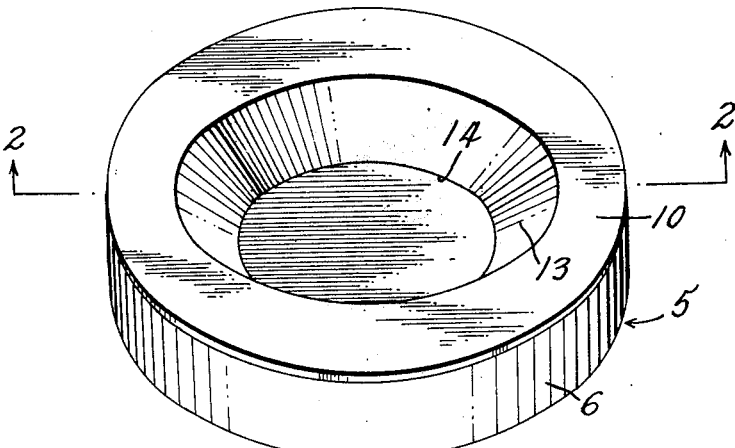
FIGURE 1 is a perspective view of the anti-splash watering device illustrating the general shape and contour thereof and showing the access opening located centrally with respect to the container.
Figure 2:
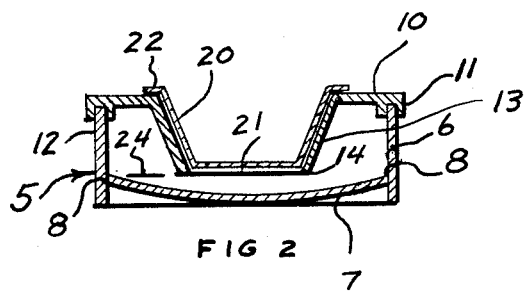
FIGURE 2 is a diametral cross-sectional view taken on line 2—2 of FIGURE 1 and looking in the direction of the arrows to illustrate the curved or dished bottom wall and showing a removable and disposable container in the access opening for receiving solid or semi-solid food.
Figure 3:
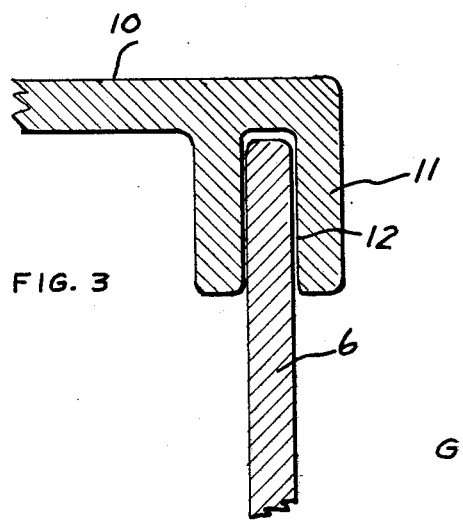
FIGURE 3 is an enlarged fragmentary vertical cross-sectional view taken through the corner joint or peripheral edge of the container for illustrating the manner in which the removable cover is frictionally and removably held in place.

In the drawing, and more in detail, attention is first directed to FIGURES 1 to 3 inclusive wherein the feeding and watering device is generally designated 5. The container comprises a cylindrical wall 6 having a dished or spherically curved bottom wall 7. The peripheral edge 8 of the bottom wall 7 is secured to the inner peripheral surface of the wall 6 in any approved manner so that the peripheral edge 8 of the dished bottom wall 7 is spaced a slight distance above the lower edge of the cylindrical wall 6. The bottom wall 7 is generated about a radius point located centrally above the container and along the longitudinal axis thereof a distance substantially equal to three times the height of the container.

The container including the cylindrical wall 6 and bottom wall 7 is formed of a synthetic resin plastic material of clear or either colored or vari-colored plastic compositions.

The upper open portion of the cylindrical wall 6 is adapted to be closed by an annular cover member 10 having a downwardly extending flange 11 provided with an annular recess 12 for receiving the upper edge of the cylindrical wall 6. The interfitting portions of the upper edge of the container wall 6 and the annular flange 11 provides a friction-type fit to prevent accidental removal of the cover 10 (FIG. 3).

Formed integral with the annular cover member 10 and centrally thereof is a downwardly extending frusto-conical wall 13 which is inverted and has its lower edge 14 terminating a distance from the dished wall 7 a distance substantially equal to one-third of the height of the container. The inverted frusto-conical wall 13 extends at an acute angle between 25 and 30° to the cone axis and the opening in the lower portion of the inverted frusto-conical wall is of a diameter substantially equal to one half the diameter of the cylindrical wall 6. With the combined feeding and watering device constructed in accordance with these proportions it has been found that the container when partly filled with water can be tilted or displaced to various angular positions without the contents being spilled but yet provide ample water supply for the animal while drinking. This result is achieved by the angular position of the wall 13 and the dished lower wall 7 which provides a large volume of water beneath the edge of the wall 13 while the volume is limited toward the peripheral edge of the dished wall 7 and peripheral wall 6.

When the device is used for feeding solids or the like to pet animals a disposable container 20 is inserted in the frusto-conical wall 6 and said container is provided with a bottom wall 21 which extends across the opening 14 and is provided at its upper edge with a radially extending flange 22 adapted to overlie the inner marginal edge of the annular wall 10. The disposable container 20 is made of light aluminum foil or the like pressed into shape or the same can be constructed of compressed viscous material such as wood, paper or similar materials which are constructed for low cost production and can be easily disposed of after use.

Figure 4:
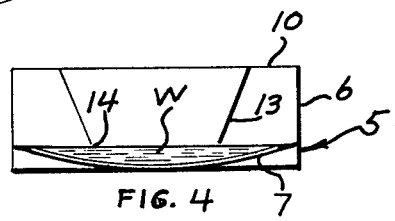
FIGURE 4 is a diagrammatic view illustrating the water level of the container during normal use.

In operation, the annular cover 10 with the depending inverted frusto-conical wall 13 is removed and the container 5 is filled or partially filled with water or other drinking liquid to a water lever mark 24 marked or printed on the inner peripheral surface of the cylindrical wall 6, (FIG. 2). The cover is then replaced with the upper edge of the cylindrical wall 6 snugly and frictionally held in the annular groove 12. With the water level as indicated the same will approach or register with the lower edge 14 of the frusto-conical wall 13 as shown in FIGURE 4. The water W will normally assume the position shown in FIGURE 4 for drinking purposes, and the pet animal or the like being transported can partake of the contents while in a passenger vehicle with the container resting on the floor. During long trips the pet animal is always supplied with a source of shrink water, thus eliminating frequent stops between long distance journeys.

Figure 5:
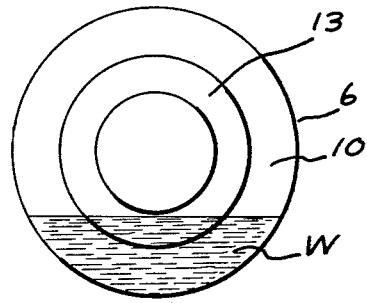
FIGURE 5 is a similar view illustrating the manner in which the water is trapped in the container should the same become tilted or displaced in a vertical position.
Figure 6:
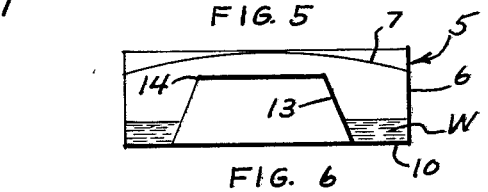
FIGURE 6 is a diagrammatic view illustrating the position of the water level in the event that the container is overturned by the accidental jarring or other blows struck to the container by the pet animal during drinking.

While the container is in the passenger vehicle and should the same be displaced by sudden vibrations imparted to the vehicle such that the container is positioned vertically as shown in FIGURE 5, the water W will be trapped and the level of the water will not overflow the lower edge 14 of the frusto-conical wall 13. Should the passenger vehicle be subjected to severe vibrations such as encountered when passing over rough roads of sufficient intensity to upset the receptacle 5 as shown in FIGURE 6 the water W will be trapped in the annular chamber formed between the walls 6–13 and the wall 10. The cover or annular wall 10 is fitted to the cylindrical wall 6 such as to provide a watertight fit between the annular flange 11 and the upper edge of the wall 6 and in addition to providing a snug friction fit therebetween the relatively smooth surfaces mutually engage in such a manner as to prevent leakage and to securely hold the cover in place.

When it is desired to clean the internal surfaces of the container 5 the cover 10 is removed and cleaned in the usual manner.

The container and cover are formed of a synthetic resin composition preferably of clear plastic material so that the contents can be observed and the liquid level in the container maintained equal to the indication mark 24.

When supplying the pet animal with solid or semi-solid food the container 20 is merely inserted in the inverted frusto-conical wall 13 without removing the water and after use is disposed of in the usual way.

It is to be understood that the form of the invention herewith shown and described is to be taken as a preferred embodiment thereof and that various changes in the shape, size and arrangement of parts can be resorted to without departing from the spirit of the invention or the scope of the subjoined claims.

Having described the invention what I claim is:

1. In an anti-splash watering device for animals, comprising a cylindrical vertical wall formed of plastic material, a dished bottom wall extending across the lower portion of said cylindrical wall also of plastic material and recessed therein, said bottom wall being arranged with its concave surface facing the interior of said device, an annular wall at the upper edge of said cylindrical wall and an inverted frusto-conical plastic wall depending centrally from said annular wall, said frusto-conical wall being provided with a lower opening terminating from the dished surface of the bottom wall a distance of approximately one-third the length of said inverted frusto-conical wall, the lower opening being in substantially the same plane as the periphery of said bottom dished wall.

2. In an anti-splash watering device for animals, a cylindrical wall, a dished bottom wall extending across the lower portion of said cylindrical wall and recessed therein, said bottom wall being arranged with its concave surface facing the interior of said device, an annular wall at the upper edge of said cylindrical wall, an inverted frusto-conical wall with its lower edge in spaced relation from said concave surface but in substantially the same plane as the periphery of said dished wall depending centrally from said annular wall and a disposable container forming a closure mounted in the upper end of said frusto-conical wall adapted for solid and semi-solid foods said disposable container being provided with a tapered peripheral wall corresponding to the taper of said frusto-conical wall to form mutually engaging tapered locking surfaces.

3. In an anti-splash watering and feeding device for animals, a container having a cylindrical wall and a dished bottom wall recessed within the lower portion of said cylindrical wall with its concave surface facing the interior of said container, an annular wall at the upper edge of said cylindrical wall, an inverted frusto-conical wall depending from said annular wall about a central opening therein with its lower edge spaced from the concave surface but in substantially the same plane as the periphery of said dished wall, and a disposable food container adapted to be optionally supported by said annular wall, the wall of said frusto-conical wall and the wall of said disposable food container being tapered to form mutually engaging locking friction surfaces to retain said food container in place and provide a cover for said first named container when the same is not in use said inverted frusto-conical wall extending downwardly into said container a distance equal to two-thirds of the container height whereby liquid in said container when displaced radially of said bottom wall by accidental jarring of said container will flow outwardly from the center and upwardly toward the periphery of said dished bottom wall and will not be displaced by engaging the lower edge of said frusto-conical wall.

4. In an anti-splash watering device for animals, a container comprising a cylinder wall, a dished wall forming a bottom for said container recessed therein with its concave surface facing the interior of said container, a removable cover for said container having a central opening, an inverted frusto-conical wall secured to the marginal edge of said opening and extending downwardly a distance substantially equal to two-thirds the height of said cylindrical wall in spaced relation from said concave surface but in substatially the same plane as the recessed peripheral edge of said bottom wall, said inverted frusto-conical wall having a slope angle of approximately 25 to 30° to the cone axis.

5. In an anti-splash watering device for animals, a container having a cylindrical wall, a spherically dished bottom wall for said container with its peripheral edge recessed in said container and spaced from the lower edge of said cylindrical wall, said dished bottom wall being arranged with its concave surface facing the interior of said container an annular wall for the upper portion of said cylindrical wall having a central opening, an inverted frusto-conical wall depending from said opening provided therein and extending downwardly into said container a distance equal to two-thrids the height of said cylindrical wall with its lower edge in spaced relation from the concave surface of said bottom wall but in substantially the same plane as the peripheral edge thereof, and a detachable connection between said annular wall and cylindrical wall forming mutually engaging friction-type waterproof surfaces.

6. In an anti-splash watering device for pet animals, comprising a container having a cylindrical wall and a spherically dished bottom wall with the peripheral edge thereof recessed and spaced from the lower edge of said cylindrical wall, said bottom wall having its concave surface facing the interior of said container, an annular cover removably secured to the upper edge of said cylindrical wall and having a peripheral depending flange provided with an annular recess for receiving the upper edge of said cylindrical wall to form a water tight friction seal, said annular cover being provided with a central opening, an inverted frusto-conical wall depending from said annular cover about the opening therein with its lower open end extending downwardly in said container a distance substantially equal to two-thirds the height of said cylindrical wall, said open end being arranged in spaced relation from said concave surface and in substantially the same plane as the periphery of said bottom wall.

7. In an anti-splash watering and feeding device for animals, a container having a cylindrical wall and a spherically dished recessed bottom wall arranged with its concave surface facing the interior of said container, an annular cover wall removably secured to the upper edge of said cylindrical wall, mutually engaging friction type surfaces between said annular cover wall and cylindrical wall to provide a friction sealing surface therebetween, an inverted frusto-conical wall depending from the annular cover wall about a central opening provided in said annular cover wall extending downwardly a distance substantially equal to two-thirds the height of said cylindrical wall with its lower opening spaced from the concave surface of said bottom wall but in the same plane as the recessed peripheral edge thereof, a water level mark on the inner peripheral surface of said cylindrical wall in substantial alignment with the lower open edge of said inverted frusto-conical wall, and a removable cover forming a disposable container supported by and within said inverted frusto-conical wall having a flange at its upper edge overlying the annular cover wall, said cover being provided with a tapered side wall surface corresponding to the internal taper of said frusto-conical wall to form mutually engaging tapered gripping surfaces adapted to prevent accidental displacement of said cover.

References Cited in the file of this patent

UNITED STATES PATENTS

| 1,332,554 | Hoffner | Mar. 2, 1920 |
| 2,213,837 | Gill | Sept. 3, 1940 |
| 3,076,435 | Seymour | Feb. 5, 1963 |

FOREIGN PATENTS

| 13,793 | Great Britain | A.D. 1909 |